United States Patent [19]
Rinta

[11] 3,763,652
[45] Oct. 9, 1973

[54] METHOD FOR TRANSPORTING FLUIDS OR GASES SPARSELY SOLUBLE IN WATER
[76] Inventor: Jussi Rinta, Simenintie 4A, Mankkaa, Finland
[22] Filed: Jan. 17, 1972
[21] Appl. No.: 218,125

[30] Foreign Application Priority Data
Jan. 22, 1971 Finland............................181/71

[52] U.S. Cl..................................... 61/.5, 137/236
[51] Int. Cl............................................. E21f 13/00
[58] Field of Search ...................... 61/.5, 15, 16, 63; 137/236; 210/83; 138/178

[56] References Cited
UNITED STATES PATENTS
3,211,167 10/1965 Clirt et al............................ 137/236

Primary Examiner—Mervin Stein
Assistant Examiner—Alex Grosz
Attorney—Roy C. Hopgood

[57] ABSTRACT

Fluids of limited solubility in water are transported through a conduit having walls that are permeable with respect to transported fluid. The conduit is surrounded by a layer of water having a pressure greater than that of the transported fluid. Accordingly water leaks into the conduit, but the transported fluid does not leak out. At suitable intervals, the leakage water is pumped off.

Figure 3:
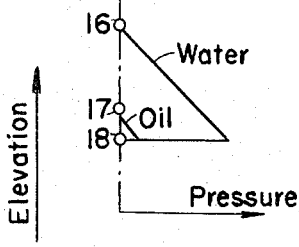

10 Claims, 6 Drawing Figures 3,763,652

METHOD FOR TRANSPORTING FLUIDS OR GASES SPARSELY SOLUBLE IN WATER

This invention deals with a method of transporting fluids or gases which have limited solubility in water.

It is previously known in storing fluids and gases sparsely soluble in water, to use a method according to which the fluid or the gas is stored either in an artificial or a natural cavern in the ground in such a way that the walls of the cavern are permeable to fluid or gas and the natural pressure of the ground-water takes care of their tightness. This is possible if the pressure of the fluid or gas being stored in the cavern at all points of the wall is smaller than the pressure of the tightening water. Previously, however, no such method has been used in transporting liquids or gases, but the transport pipes have had to be made from material impermeable to liquids or gases, for instance from steel. However, such pipes are costly and building the pipe lines in difficult terrain in particular also requires large costs.

The object of this invention is to eliminate the disadvantages referred to above, which is accomplished by the method according to the invention, mainly characterized by transporting being carried out in a tunnel or a pipe conduit with its wall permeable to fluids or gases, preventing the fluid or gas being transported from leaking away from the tunnel or the pipe by surrounding it by water with a pressure higher than that of the fluid or gas being transported, so that water may seep into the tunnel or the pipe.

Any water entered into the pipe is pumped off at suitable intervals along the tunnel or the pipe.

The invention also includes a device for accomplishing the above described method.

The advantage of the invention is primarily that the wall of the tunnel does not have to be tight at all, and also that the pipe can be made of cheap material permeable to fluids and gases. Particularly if the quantities of material to be transported are great, the favourable costs of tunnel excavation are considerably lower than the costs of a tight pipe line with the same transporting capacity.

Figure 1:
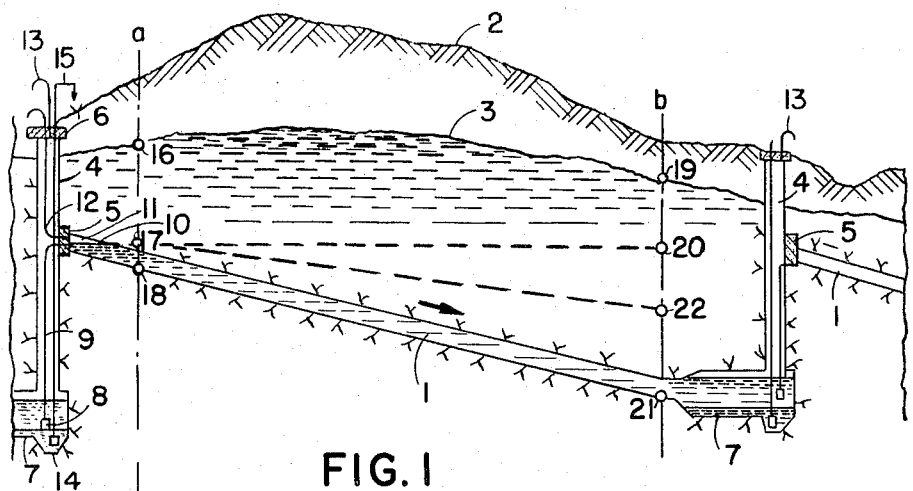
Figure 4:
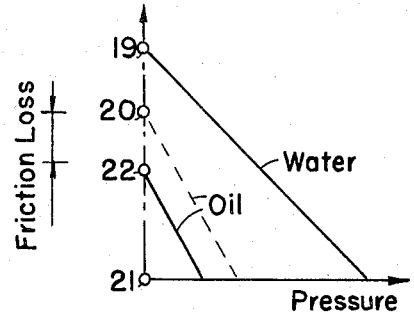
Figure 2:
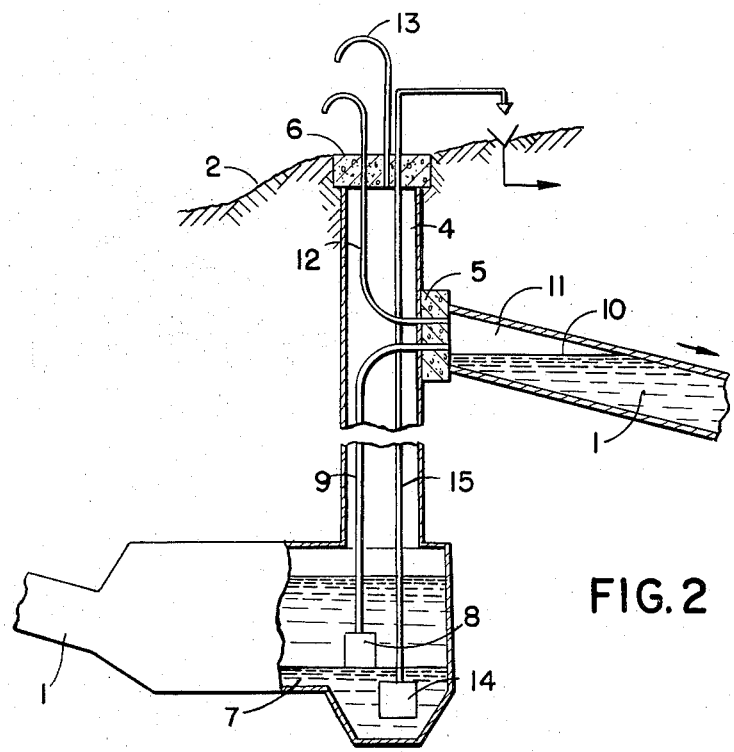
Figure 5:
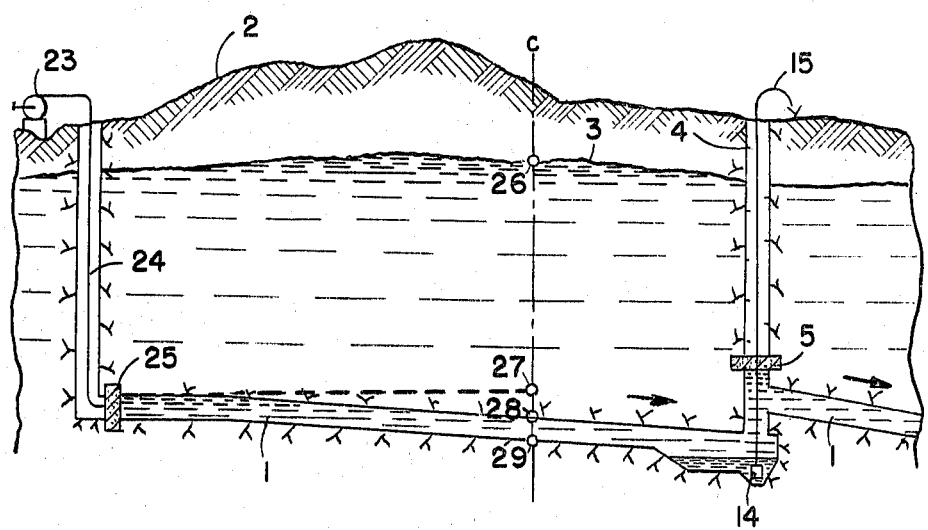
Figure 6:
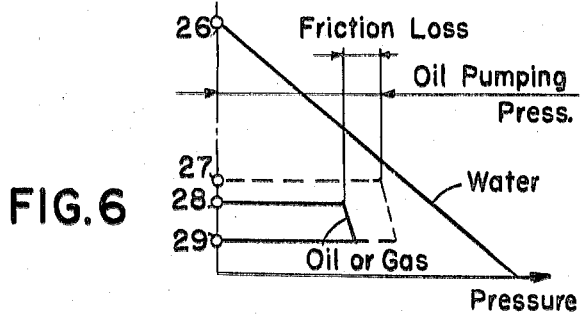

The invention is explained further in the following specification and in the enclosed schematical drawings, in which FIG. 1 presents a vertical longitudinal section of a part of a device adapted for transporting fluids and used for accomplishing the method according to a first mode of application of the invention, FIG. 2 presents on a larger scale the starting end of the device according to FIG. 1, FIG. 3 and 4 present pressure diagrammes of the fluid to be transported, for instance oil and water respectively, at points *a* and *b* of the tunnel, FIG. 5 presents in the same way as FIG. 1 the starting portion of the device used for accomplishing the method according to a second mode of application of the invention, and FIG. 6 presents a pressure diagram of the fluid to be transported, for instance oil and water, at point *c* of the tunnel.

According to FIGS. 1 and 2 the tunnel for the fluid to be transported, or its longitudinal successive parts 1, is built under the surface 2 of the ground sufficiently deep under the ground-water table 3. The successive tunnel portions 1 are made to slope in the direction of the arrow, each between two vertical pumping shafts 4.

At the upper end of each tunnel portion 1 beside the pumping shaft 4 closure 5 is made, for instance of concrete, and at the upper end of the pumping shaft likewise a closure 6. An enlargement 7 is made in the lower end of each tunnel portion 1, which is connected to the lower end of the pumping shaft 4, and in which water that has seeped into the tunnel is separated from the fluid being transported, as will be explained further on. As a material like this, oil in the presented case, is lighter than water, it rises to the surface of the ground or leakage water collected in the enlargement 7. Henceforth, the fluid to be transported will be called oil in this specification.

The oil is conducted first to the starting end of the entire tunnel, and due to gravity runs from here along to the first extreme left portion 1 of the tunnel in FIGS. 1 and 2, to the enlargement 7 on top of the water collected here. From here the oil is pumped by a pump 8 mounted into the enlargement upwards along a pipe 9 arranged within the pumping shaft 4. The pipe 9 passes through the closure 5 to the upper end of the next tunnel portion. The oil pumped to this place practically pressureless due to gravity runs along the tunnel portion into the enlargement 7 of the next tunnel portion. In the upper end of the tunnel portion 1 an air space 11 remains between the oil surface 10 and the upper surface of the tunnel, from which a breathing or ventilation pipe 12 is leading by way of the pumping shaft 4 through the closure 5, and through the closure 6 at its upper end to the open air. In addition another ventilation pipe 13 leads from the upper part of the pumping shaft 4 through the closure 6 to the open air. Because, according to below, the pressure of the ground-water surrounding the tunnel at each point of the wall is larger than the pressure of the oil in the tunnel, the oil is not able to flow into the porous wall and through the same. Instead, ground-water penetrates into the tunnel. The ground-water penetrated into the tunnel collects on the bottom of the enlargement 7 and is pumped off by means of the seapage-water pump 14 arranged in the pumping shaft 4, from which the pipe 15 by way of the shaft leads through the closure 6 at it upper end above the surface 2 of the ground.

FIG. 3 presents a pressure diagramme at the vertical line *a* in FIG. 1, at which the fluid to be transported is pumped practically pressureless to the starting end of the tunnel portion 1, and is flowing downwards due to gravity. The line *a* intersects the ground-water table 3 at point 16, the oil surface 10 at the upper end of the tunnel portion 1 at point 17, and the lower surface of the tunnel portion 1 at point 18. The corresponding points of intersection are marked by same designations in the pressure diagramme of FIG. 3. This reveals the increase of the ground-water pressure going from its upper surface, i.e. from point 17 to point 17, i.e. to the lower surface of the tunnel portion 1, as well as the increase of the oil pressure in the tunnel portion 1 between point 17 and 18, i.e. between the upper and lower surface of the oil at the line *a*. Then the pressure of the oil is always smaller than the pressure of the ground-water affecting the wall of the tunnel portion 1, on account of which ground-water is always able to enter into the tunnel portion 1, but oil not able to leave, and in this way tightening of the tunnel is accomplished.

FIG. 4 presents a pressure diagramme at the vertical line *b* in FIG. 1. The line *b* intersects the ground-water surface 3 at point 19, the plane of the surface of the oil at the upper end of the tunnel portion 1 at point 20, and the lower surface of the tunnel portion 1 at point 21. The distance between the point 20 and the point 22 below it represents the friction loss of the flowing liquid head, at which the pressure of the oil at the line b is presented by the whole line, and again the dotted line presents the pressure of the oil when the friction loss is not taken into count. This is the case, for instance, in the case when flowing has stopped. As this diagramme also reveals, the pressure of the water surrounding the tunnel portion 1 is larger than the pressure of the oil in the tunnel portion 1.

In the mode of application presented in FIG. 5, the material to be transported is pumped with overpressure to the starting end of the tunnel, at which the device according to this mode of application is also suited for transporting gases sparsely soluble in water. Also in this mode of application a vertical pumping shaft 4 is made between each two successive tunnel portions 1, which is connected with the enlargement 7 at the end of the preceding tunnel portion 1 in respect of the flow direction of the material being transported. From the leakage water pump 14 arranged into this dilation, the pipe 13 is going through the closure made into the pumping shaft 4 to the surface 2 of the ground, below which closure the next tunnel portion 1, begins. From the starting end of the first tunnel portion 1 the vertical shaft 4 leads to the surface of the ground. The pump 23 mounted on the ground is pumping the material being transported with overpressure through the pipe 24 mounted into the shaft at the starting end of the tunnel portion 1, at which the pipe 24 is going through the closure 25 arranged at the connecting point between the shaft and the tunnel portion 1.

Also in the case presented above, the pressure of the ground-water surrounding the tunnel is greater than the pressure of the material being transported contained in the tunnel, as FIG. 6 discloses. In FIG. 5, the vertical line c intersects the ground-water surface 3 at point 26, the horizontal plane of the material being transported situated in the starting end of the tunnel portion 1 at point 27, the upper surface of the tunnel portion 1 at point 28, and the lower surface of same at point 29. Because the pressure of the oil or gas in the tunnel, which equals the pumping pressure minus the flow friction loss, is smaller than the pressure of the ground-water surrounding the tunnel, the fluid being transported is not able to penetrate the walls of the tunnel.

Naturally, the invention is not restricted to the working examples presented above, but it can be varied considerably as to details within the scope of the patent claims. Thus, for example, an artificial water curtain surrounding the tunnel may be used instead of natural ground-water, which is accomplished by charging the environment of the tunnel with water, while its pressure at all points is larger than the pressure of the tunnel content. Likewise, it is possible to use a combination of the methods presented in connection with the devices according to FIGS. 1 and 5, i.e. the fluid to be transported along some part of the length of the tunnel is able to move due to gravity, and along some other part due to overpressure accomplished by a pump. Furthermore, instead of or in addition to a tunnel it is possible to use a porous pipe line mounted below the groundwater surface as a conduit for transporting the material. Such a pipeline may be situated for instance on the bottom of a watercourse. In places where the ends of the tunnel are at very different level, it may be both advantageous and necessary to lower the static pressure of the fluid being transported, either by choking the flow or, for instance, making it run a turbine, the energy of which can be utilized. For running the turbine it would also be possible to use the water penetrating into the tunnel.

I claim:

1. A method of transporting a fluid which has limited solubility in water comprising:
    passing said fluid through at least one conduit having walls that are permeable with respect to said fluid, said conduit being surrounded by a layer of water having a pressure higher than that of said fluid; and
    separating the water which enters the conduit through said permeable walls from said fluid being transported and pumping it out of said conduit at spaced-apart locations.

2. The method of claim 1, wherein the conduit is disposed within the ground at a level below the water table.

3. The method of claim 1, wherein the fluid is caused to pass through said conduit by an overpressure produced by pumping.

4. The method of claim 1, wherein the layer of water surrounding the conduit is provided by charging the environment of the conduit with water.

5. The method of claim 1, further comprising passing said fluid to be transported through a series of successive conduits each of which is inclined in the direction of transport.

6. The method of claim 1, wherein said water is separated by collecting it in an enlargement at an end of said conduit from which it is pumped off.

7. The method of claim 1, wherein said fluid is a petroleum product.

8. An arrangement for transporting a fluid of limited solubility in water comprising least one conduit having walls that are permeable to said fluid surrounded by a layer said water of greater pressure than siad fluid being transported, and pumping means for separating the water which enters said conduit through its permeable walls and pumping it off at suitable spaced locations along the conduit.

9. The arrangement of claim 8, wherein said pumping means comprises an enlargement at the end of said conduit wherein said water is accumulated, and a pump for removing said water from said enlargement.

10. The arrangement of claim 9, further comprising a series of connected similar conduits each inclined in the direction of transport.

* * * * *